US008724991B2

(12) United States Patent
Sarashina et al.

(10) Patent No.: US 8,724,991 B2
(45) Date of Patent: May 13, 2014

(54) DYNAMIC COMMUNICATION BANDWIDTH ALLOCATION METHOD, COMPUTER-READABLE MEDIUM STORING DYNAMIC COMMUNICATION BANDWIDTH ALLOCATION PROGRAM, SEMICONDUCTOR CHIP, AND PON SYSTEM (75) Inventors: Masahiro Sarashina, Saitama (JP); Satoshi Furusawa, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 153 days.

(21) Appl. No.: 13/398,821

(22) Filed: Feb. 16, 2012

(65) Prior Publication Data
US 2012/0257894 A1 Oct. 11, 2012

(30) Foreign Application Priority Data
Apr. 5, 2011 (JP) .................................. 2011-083476

(51) Int. Cl.
*H04J 14/00* (2006.01)
(52) U.S. Cl.
USPC ................................. 398/58; 398/67; 398/72
(58) Field of Classification Search
USPC ......................................... 398/58, 67, 70–72
See application file for complete search history.

(56) References Cited

U.S. PATENT DOCUMENTS

| 2007/0122151 | A1  |   | 5/2007 | Watanabe      |         |
|--------------|-----|---|--------|---------------|---------|
| 2010/0021161 | A1  | * | 1/2010 | Endo et al.   | 398/45  |
| 2010/0074628 | A1  | * | 3/2010 | Murakami et al. | 398/182 |
| 2010/0239255 | A1  | * | 9/2010 | Ikeda et al.  | 398/66  |
| 2011/0085795 | A1  | * | 4/2011 | Ozaki         | 398/25  |

FOREIGN PATENT DOCUMENTS

JP 2007-129429 A 5/2007

* cited by examiner

*Primary Examiner* — Dalzid Singh
(74) *Attorney, Agent, or Firm* — Rabin & Berdo, P.C.

(57) ABSTRACT

The present invention provides a station-side terminal device including a control signals reading/generating section that receives a requested bandwidth which the subscriber-side terminal devices require for the communication, from each of the subscriber-side terminal devices, and an uplink band allocating section including a first calculation section that allocates a usable communication bandwidth to each of the subscriber-side terminal devices based on a ratio of a service level parameter predetermined for each of the subscriber-side terminal devices, and a second calculation section that obtains an updated usable communication bandwidth updated by subtracting a sum of the allocated bandwidths from the usable communication bandwidth, and obtains an updated requested bandwidth updated by subtracting the allocated bandwidth from the requested bandwidth, to allocate the updated usable communication bandwidth to each of the subscriber-side terminal devices based on a ratio of the updated requested bandwidth.

17 Claims, 7 Drawing Sheets

DYNAMIC COMMUNICATION BANDWIDTH ALLOCATION METHOD, COMPUTER-READABLE MEDIUM STORING DYNAMIC COMMUNICATION BANDWIDTH ALLOCATION PROGRAM, SEMICONDUCTOR CHIP, AND PON SYSTEM

CROSS-REFERENCE TO RELATED APPLICATION

This application claims priority under 35 USC 119 from Japanese Patent Application No. 2011-083476, filed on Apr. 5, 2011, the disclosure of which is incorporated by reference herein.

BACKGROUND OF THE INVENTION

1. Field of the Invention

The present invention relates to a dynamic communication bandwidth allocation method, a computer-readable medium storing a dynamic communication bandwidth allocation program, and a PON (Passive Optical Network) system, for allocating a communication band in an uplink direction to optical network sections (ONUs).

2. Description of the Related Art

A PON system is known as an optical communication system that connects an optical line terminal (hereinafter, referred to as "OLT" or "station-side terminal") and plural ONUs (hereinafter, referred to as "subscriber-side terminal") through optical fibers.

As a developed type of this PON system, a GE-PON (Gigabit Ethernet PON) system to which a Gigabit Ethernet technique used in a LAN (Local Area Network) is applied, and that connects the OLT and the ONU with a communication speed of 1 Gbps or higher, has been put into practical use.

In the GE-PON system, the OLT manages transmission timing and communication bandwidths of the ONUs under itself, to prevent optical signals in the uplink direction from the plural ONUs from colliding with one another on time axis. A technique of dynamically managing the communication bandwidths of the ONUs in accordance with a state of communication traffic is so called, dynamic bandwidth allocation (DBA). Hereinafter, an example of DBA will be described.

In DBA, each of the ONUs requests the communication bandwidth in witch the requested ONU requires, to the OLT. Hereinafter, this requested width is referred to as a requested bandwidth. The OLT receives the requested bandwidths from the respective ONUs, distributes the communication band to the respective ONUs in accordance with ratios of the requested bandwidths of the respective ONUs, and notifies to the respective ONUs.

However, in the management of the communication band by DBA in the above example, a service level agreement (SLA) parameter predetermined for each of the ONUs, such as a maximum allocation band and the like, is not reflected in the allocation of the communication band. In contrast, a technique in which the SLA parameter is reflected on the allocation of the communication band to the ONUs has been known (e.g., Japanese Patent Application Laid-Open (JP-A) No. 2007-129429).

In the technique described in JP-A No. 2007-129429, the OLT distributes the communication band to the respective ONUs in accordance with ratios of the SLA parameter of the respective ONUs.

In the technique described in JP-A No. 2007-129429, the ratio of the SLA parameter is used for the allocation of the communication band and not the ratio of the requested bandwidth. Accordingly, deficiency and excess may occur between the requested bandwidth and the bandwidth allocated by the OLT.

In order to solve this deficiency and excess, in the technique in JP-A No. 2007-129429, calculation for allocating a excess of the ONU in which the communication band is allocated excessively, to the ONU whose communication band is deficient, in accordance with the SLA parameter ratio, is repeated until the excess of the communication band is eliminated.

However, in the technique of JP-A No. 2007-129429, a number of repetitions of the calculation is large, thereby increasing calculation time. Further, if the calculation is terminated before the distribution of the excess ends, an unallocated band occurs, thereby deteriorating band utilization efficiency.

SUMMARY OF THE INVENTION

The present invention provides a PON system, a dynamic communication bandwidth allocation method, a semiconductor chip, and a computer-readable medium storing a dynamic communication bandwidth allocation program, that may reflect an SLA parameter ratio when allocating the communication band, and may shorten calculation time when compared to the conventional technique.

According to the present invention, when the allocation calculation of the communication band is performed, the allocation is performed based the SLA parameter ratio in the first calculation, and the allocation is performed in accordance with a ratio of a requested bandwidth in the second calculation.

Namely, a first aspect of the present invention is a dynamic communication bandwidth allocation method for allocating a communication band to each of a plurality of subscriber-side terminal devices in a PON system that connects, via an optical couple, the plurality of subscriber-side terminal devices and an station-side terminal device to perform communication, the method, in the station-side terminal device, including: receiving a requested bandwidth, which is a bandwidth that the relevant subscriber-side terminal device requires for the communication, from each of the subscriber-side terminal devices; calculating a usable communication bandwidth as a first allocation bandwidth for each of the subscriber-side terminal devices based on a ratio of a service level parameter predetermined for each of the subscriber-side terminal devices, comparing the first allocation bandwidth and the requested bandwidth, and allocating the requested bandwidth to the subscriber-side terminal device if the first allocation bandwidth is more than the requested bandwidth, and allocating the first allocation bandwidth to the subscriber-side terminal device if the first allocation bandwidth is less than the requested bandwidth; and obtaining an updated usable communication bandwidth updated by subtracting a sum of the allocated bandwidths from the usable communication bandwidth, and obtaining an updated requested bandwidth updated by subtracting the allocated bandwidth from the requested bandwidth, and allocating the updated usable communication bandwidth to each of the subscriber-side terminal devices as a second allocation bandwidth based on a ratio of the updated requested bandwidth.

A second aspect of the present invention, in the first aspect, after receiving the requested bandwidth, may further include: allocating a fixed band predetermined for each of the subscriber-side terminal devices, calculating a sum of the fixed bands, using a value obtained by subtracting the sum of the fixed bands from the usable overall communication bandwidth as the usable communication bandwidth; and updating the requested bandwidth by subtracting, for each of the subscriber-side terminal devices, the fixed band from the requested bandwidth.

A third aspect of the present invention, in the first aspect, allocating the updated usable communication bandwidth to each of the subscriber-side terminal devices as the second allocation bandwidth may include: comparing the second allocation bandwidth and the updated requested bandwidth; allocating the updated requested bandwidth to the subscriber-side terminal device, if the second allocation bandwidth is more than the updated requested bandwidth; and allocating the second allocation bandwidth to the subscriber-side terminal device, if the second allocation bandwidth is less than the updated requested bandwidth.

A fourth aspect of the present invention, in the first aspect, the service level parameter may be a minimum guaranteed band or a maximum allocation band.

A fifth aspect of the present invention is A computer-readable medium storing a dynamic communication bandwidth allocation program for allocating a communication band to each of a plurality of subscriber-side terminal devices in a PON system that connects, via an optical coupler, the plurality of subscriber-side terminal devices and a station-side terminal device to perform communication, the dynamic communication bandwidth allocation program causing the station-side terminal device to function as: a control signal reading/generating section that receives a requested bandwidth, which is a bandwidth that the relevant subscriber-side terminal device requires for the communication, from each of the subscriber-side terminal devices; a first calculation section that, calculates a usable communication bandwidth as a first allocation bandwidth for each of the subscriber-side terminal devices based on a ratio of a service level parameter predetermined for each of the subscriber-side terminal devices, compares the first allocation bandwidth and the requested bandwidth, and allocates the requested bandwidth to the subscriber-side terminal device if the first allocation bandwidth is more than the requested bandwidth, and allocates the first allocation bandwidth to the subscriber-side terminal device if the first allocation bandwidth is less than the requested bandwidth; and a second calculation section that obtains an updated usable communication bandwidth updated by subtracting a sum of the allocated bandwidths from the usable communication bandwidth, obtains an updated requested bandwidth updated by subtracting the allocated bandwidth from the requested bandwidth, and allocates the updated usable communication bandwidth to each of the subscriber-side terminal devices as a second allocation bandwidth based on a ratio of the updated requested bandwidth.

[0025]
A sixth aspect of the present invention is a PON system that connects, via an optical coupler, a plurality of subscriber-side terminal devices and an station-side terminal device to perform communication, and allocates a communication band to the subscriber-side terminal devices, the station-side terminal device including: a control signal reading/generating section that receives a requested bandwidth which is a bandwidth that the relevant subscriber-side terminal device requires for the communication, from each of the subscriber-side terminal devices; and an uplink band allocating section including, a first calculation section that calculates a usable communication bandwidth as a first allocation bandwidth for each of the subscriber-side terminal devices based in a ratio of a service level parameter predetermined for each of the subscriber-side terminal devices, compares the first allocation bandwidth and the requested bandwidth, and allocates the requested bandwidth to the subscriber-side terminal device if the first allocation bandwidth is more than the requested bandwidth, and allocates the first allocation bandwidth to the subscriber-side terminal device if the first allocation bandwidth is less than the requested bandwidth, and a second calculation section that obtains an updated usable communication bandwidth updated by subtracting a sum of the allocated bandwidths from the usable communication bandwidth, and obtains an updated requested bandwidth updated by subtracting the allocated bandwidth from the requested bandwidth to allocate the updated usable communication bandwidth to each of the subscriber-side terminal devices as a second allocation bandwidth based on a ratio of the updated requested bandwidth.

According to the above-described aspects of the present invention, in the first allocation in a second process, allocation is performed based on the ratios of the SLA parameter between the subscriber-side terminal devices. Next, in the above-described aspects, in the second allocation in a third process, an excess of the communication band occurred in the first allocation is allocated based the ratios of the updated requested bandwidth between the subscriber-side terminal devices. As a result, in the above-described aspects, the excess of the communication band may not occur after the third process is completed, and the ratios of the SLA parameter between the subscriber-side terminal devices may be reflected in allocating the communication band, and may reduce the number of calculation for the allocation to two.

According to the above-described aspects, the present invention may reflect the SLA parameter ratio when allocating the communication band, and may shorten the calculation time.

BRIEF DESCRIPTION OF THE DRAWINGS

An Exemplary embodiment of the present invention will be described in detail based on the following figures, wherein.

DETAILED DESCRIPTION OF THE INVENTION

Hereinafter, an exemplary embodiment of the present invention will be described with reference to the drawings. In each of the drawings, shapes, sizes and arrangements of sections are shown schematically for enabling the understanding of the present invention. Moreover, note that, hereinafter, preferred configuration examples of the present invention will be described, and numerical conditions of the sections and the like are merely examples. Accordingly, the present invention is not limited to the following exemplary embodiment. In the respective diagrams, the same reference numerals are given to common sections, and descriptions thereof may be omitted.

(GE-PON System)

Figure 1:
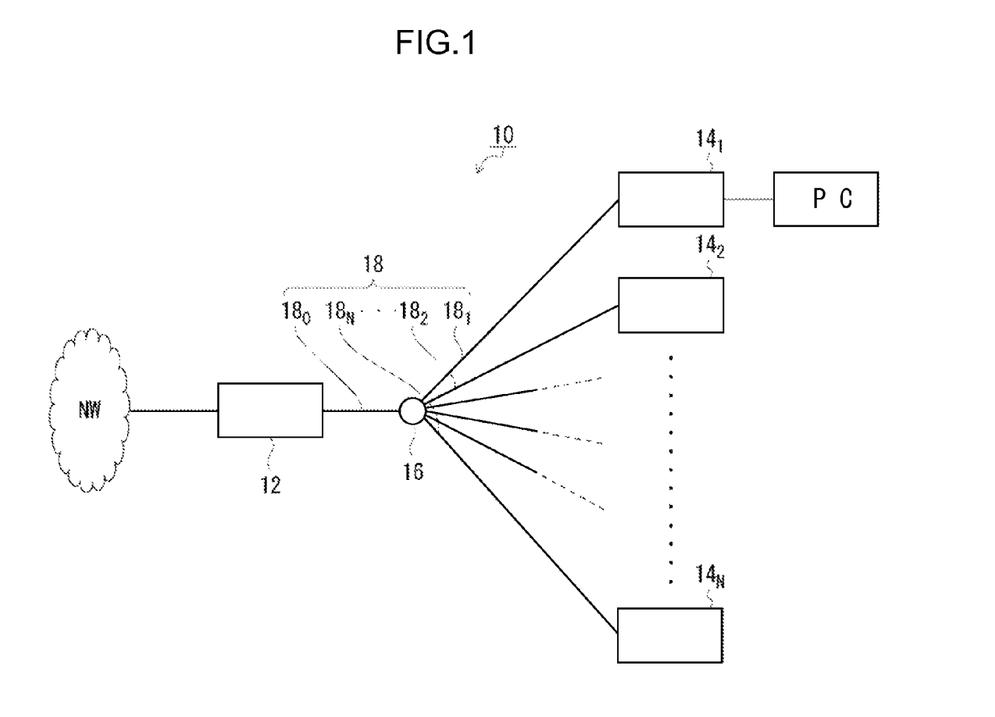
FIG. 1 is a schematic diagram showing a configuration of a GE-PON system of an exemplary embodiment of the present invention.

FIG. 1 is a schematic diagram showing a configuration of a GE-PON system as an example of the exemplary embodiment of the PON system. Firstly, by referring to FIG. 1, the GE-PON system will be described.

The GE-PON system 10 includes one station-side terminal 12 (hereinafter, merely referred to as an "OLT 12"), and plural subscriber-side terminals $14_1$ to $14_N$ (hereinafter, referred to as "ONUs $14_1$ to $14_N$"), an optical coupler 16, and an optical fiber 18.

The OLT 12 is included inside a communication base station, and converts communication data from upper network NW, such as the internet, to optical signals to send to each of the ONUs $14_1$ to $14_N$. Further, the OLT 12 converts optical signals including communication data received from each of the ONUs $14_1$ to $14_N$ to electric signals to send to the upper network NW.

The ONUs $14_1$ to $14_N$ are each installed inside a home of a service user (hereinafter, referred to as a "user"), and are each connected to a user device PC such as a personal computer, LAN or the like, through an interface. The ONUs $14_1$ to $14_N$ each convert data inputted from the user device PC to optical signals to send to the OLT 12 (uplink communication). Moreover, the ONUs $14_1$ to $14_N$ each convert optical signals sent from the OLT 12 to electric signals to send the same to the user device PC (downlink communication).

When performing the uplink communication to the OLT 12, the ONUs $14_1$ to $14_N$ needs to be subjected for allocation of the communication band from the OLT 12. Uplink communication band is divided into a minimum guaranteed band, which is allocated regardless to a status of traffic, and a best effort band which is allocated with variable allocation amount which varies based on communication status of the ONUs $14_1$ to $14_N$.

In allocating the best effort band, the ONUs $14_1$ to $14_N$ request the communication bandwidths in which themselves require, to the OLT 12, as requested bandwidths $Q_1$ to $Q_N$.

After receiving the requested bandwidths from all the ONUs $14_1$ to $14_N$ under itself, the OLT 12 searches allocation bandwidths to be allocated to the respective ONUs $14_1$ to $14_N$, in accordance with a dynamic communication bandwidth allocation method. The OLT 12 sends the searched allocation bandwidths to the respective ONUs $14_1$ to $14_N$. The respective ONUs $14_1$ to $14_N$ that has receives the allocated bandwidth, perform the uplink communication with the allocated bandwidths.

The users that possess the ONUs $14_1$ to $14_N$ each make a service level agreement with a communication carrier that possesses the OLT. The agreement includes, such as, for example, an SLA parameter including a maximum allocation bandwidth, which is allocated to each of the ONUs for each user at the time of the uplink communication. In the communication, it is important for the communication carrier to allocate the communication bands with respect to the ratios of the SLA parameter to the respective ONUs $14_1$ to $14_N$. Namely, it is important to differ the communication speed due to a magnitude of the SLA parameter.

Referring to FIG. 1, the optical fiber 18 includes a main line $18_0$ that connects the OLT 12 to the optical coupler 16, and branch lines $18_1$ to $18_N$ that connects the optical coupler 16 to the respective ONUs $14_1$ to $14_N$. The optical fiber 18 is a single-core single-mode optical fiber, and transmits optical signals in a single propagating mode. The optical signals transmitted through the optical fiber 18 is transmitted by wavelength multiplexing method, in which different wavelengths are used between downlink optical signals sent from the OLT 12 to each of the ONUs $14_1$ to $14_N$, and uplink optical signals sent from each of the ONUs $14_1$ to $14_N$ to the OLT 12.

The optical coupler 16 is provided at bifurcation point between the main line $18_0$ and the branch lines $18_1$ to $18_N$ of the optical fiber 18. The optical coupler 16 has a function of de-multiplexing the above-described downlink optical signals for each of the ONUs $14_1$ to $14_N$, and multiplexing the uplink optical signals sent from the ONUs $14_1$ to $14_N$ to transmit the resultant to the OLT 12. The optical coupler 16 does not need to be power feed from outside, and passively multiplexes/de-multiplexes the inputted uplink optical signals and the downlink optical signals.

(OLT)

Figure 2:
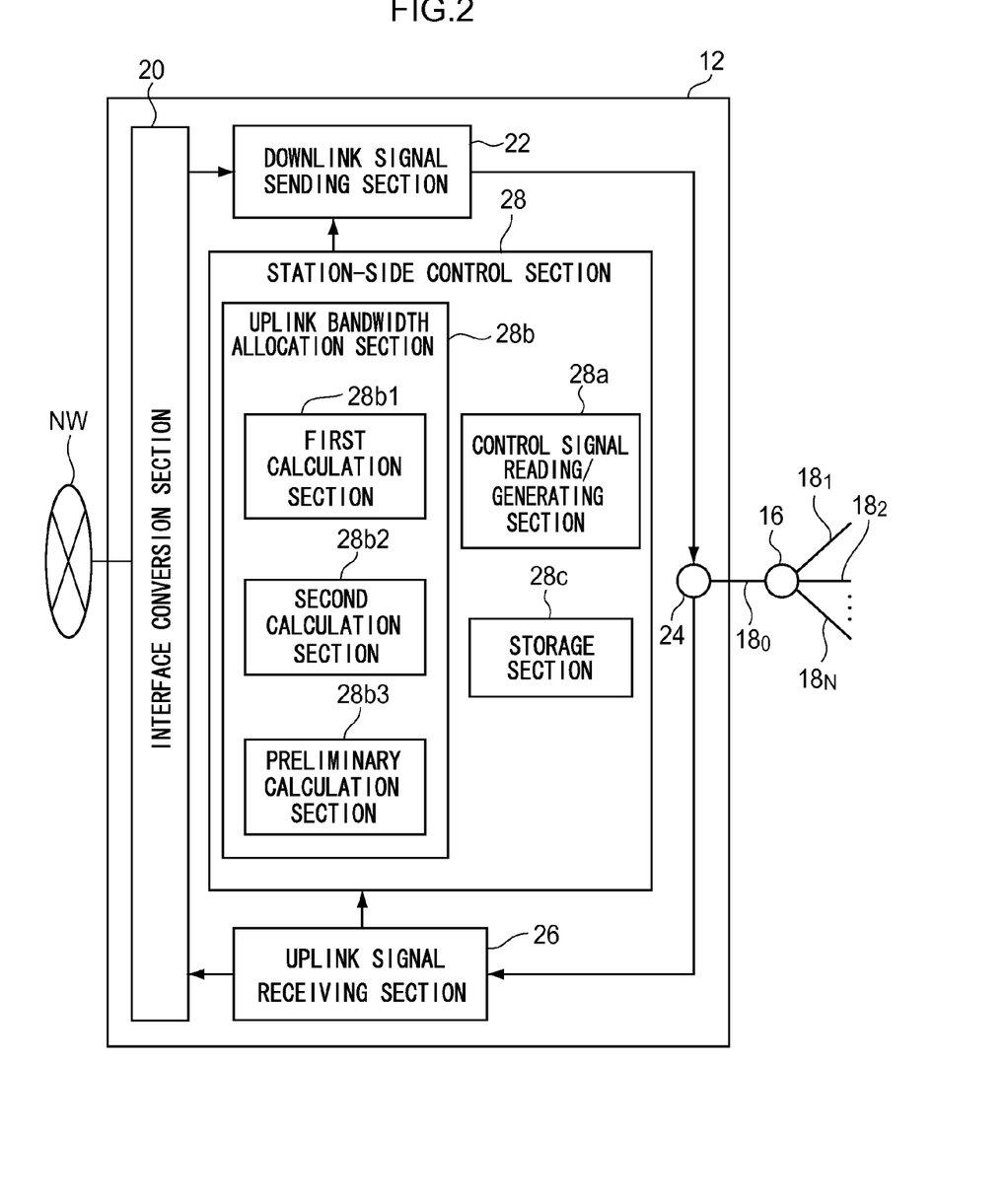
FIG. 2 is a block diagram showing hardware and functional configuration of an OLT.

A configuration of the OLT 12 will be described by referring to FIG. 2. FIG. 2 is a block diagram showing hardware and functional configuration of the OLT 12. Since the OLT 12 may have a conventional configuration except for a configuration of a station-side control section 28, the illustration of functional blocks of the OLT 12 is partially omitted.

The OLT 12 includes an interface conversion section 20, a downlink signal sending section 22, an optical multiplexer/de-multiplexer 24, an uplink signal receiving section 26, and the station-side control section 28.

The OLT 12 may be made of a semiconductor chip on which the interface conversion section 20, the downlink signal sending section 22, the optical multiplexer/de-multiplexer 24, the uplink signal receiving section 26, and the station-side control section 28 are formed.

The uplink signal receiving section 26 performs optical-electrical conversion to the uplink optical signals received from each of the ONUs $14_1$ to $14_N$, to obtain the uplink electric signals. The uplink electric signals are split into uplink control signals and uplink data signals, to output the uplink control signals to the station-side control section 28 and output the uplink data signals to the interface conversion section 20.

The interface conversion section 20 performs communication protocol process with the upper network NW. More particularly, the interface conversion section 20 outputs downlink data signals from the upper network NW to the downlink signal sending section 22. Moreover, the interface conversion section 20 is inputted with the uplink data signals from the uplink signal receiving section 26, and the interface conversion section 20 outputs the uplink data signals to the upper network NW.

In response to the reception of the uplink control signals, the station-side control section 28 generates downlink control signals to output to the downlink signal sending section 22.

The downlink signal sending section 22 time-multiplexes the downlink data signals sent from the interface conversion section 20, and the downlink control signals sent from the station-side control section 28, to generate downlink electric signals. Furthermore, the downlink signal sending section 22 performs electrical-optical conversion to the downlink electric signals to generate the downlink optical signals, and send the same to the ONUs $14_1$ to $14_N$ through the optical multiplexer/de-multiplexer 24.

The optical multiplexer/de-multiplexer 24 multiplexes and de-multiplexes the downlink optical signals and the uplink optical signals. Generally, since central wavelengths of the uplink optical signals and the downlink optical signals are different, an optical filter or the like is used as the optical multiplexer/de-multiplexer 24.

The "downlink data signals" are signals transmitted from the upper network NW to the user device PC, on which a response from the upper network NW based on a request from a user are carried. The "uplink data signals" are signals transmitted from the user device PC to the upper network NW, on which the requests from the user to the upper network NW are carried.

The "downlink control signals" are signals that the station-side control section 28 sends to a subscriber-side control section 44 of each of the ONUs $14_1$ to $14_N$. On the downlink control signals, information such as the allocation bandwidth to be allocated for each of the ONUs $14_1$ to $14_N$, send timing of the uplink communication, and the like, are carried. Moreover, the "uplink control signals" are signals that the subscriber-side control section 44 of each of the ONUs $14_1$ to $14_N$ sends to the station-side control section 28. The "uplink control signals" carry information such as the requested bandwidth of each of the ONUs $14_1$ to $14_N$, and the like. In order to perform the stable communication between the OLT 12 and the ONUs $14_1$ to $14_N$, the control signals need to be sent and received periodically.

As described above, the "downlink signals" includes the time-multiplexed downlink control signals and downlink data signals. The downlink signals is referred to as the "downlink electric signals" when it takes a form of the electric signals, and is referred to as the "downlink optical signals" when it takes a form of the optical signals.

Moreover, the "uplink signals" includes the time-multiplexed uplink control signals and uplink data signals. The uplink signals is referred to as the "uplink electric signals" when it takes a form of the electric signals, and is referred to as the "uplink optical signals" when it takes a form of the optical signals.

The station-side control section 28 is configured as a computer system, in terms of hardware, including a CPU (Central Processing Section, not shown), and a storage section 28c such as a ROM (Read Only Memory), a RAM (Random Access Memory) and a hard disk device, and the like.

Here, the CPU reads and executes a program stored in the storage section 28 to implement a control signal reading/generating section 28a and an uplink band allocating section 28b as functional sections. Moreover, process results of the control signal reading/generating section 28a and the uplink band allocating section 28b are stored in the storage section 28c.

The CPU controls the interface conversion section 20, the downlink signal sending section 22, the optical multiplexer/de-multiplexer 24, the uplink signal receiving section 26, and the station-side control section 28 to operate the OLT 12.

The uplink band allocating section 28b includes a first calculation section 28b1 and a second calculation section 28b2. Moreover, the uplink band allocating section 28b may include a preliminary calculation section 28b3.

Details of functions and operations of the control signals reading/generating section 28a and the uplink band allocating section 28b will be described later.

(ONU)

Figure 3:
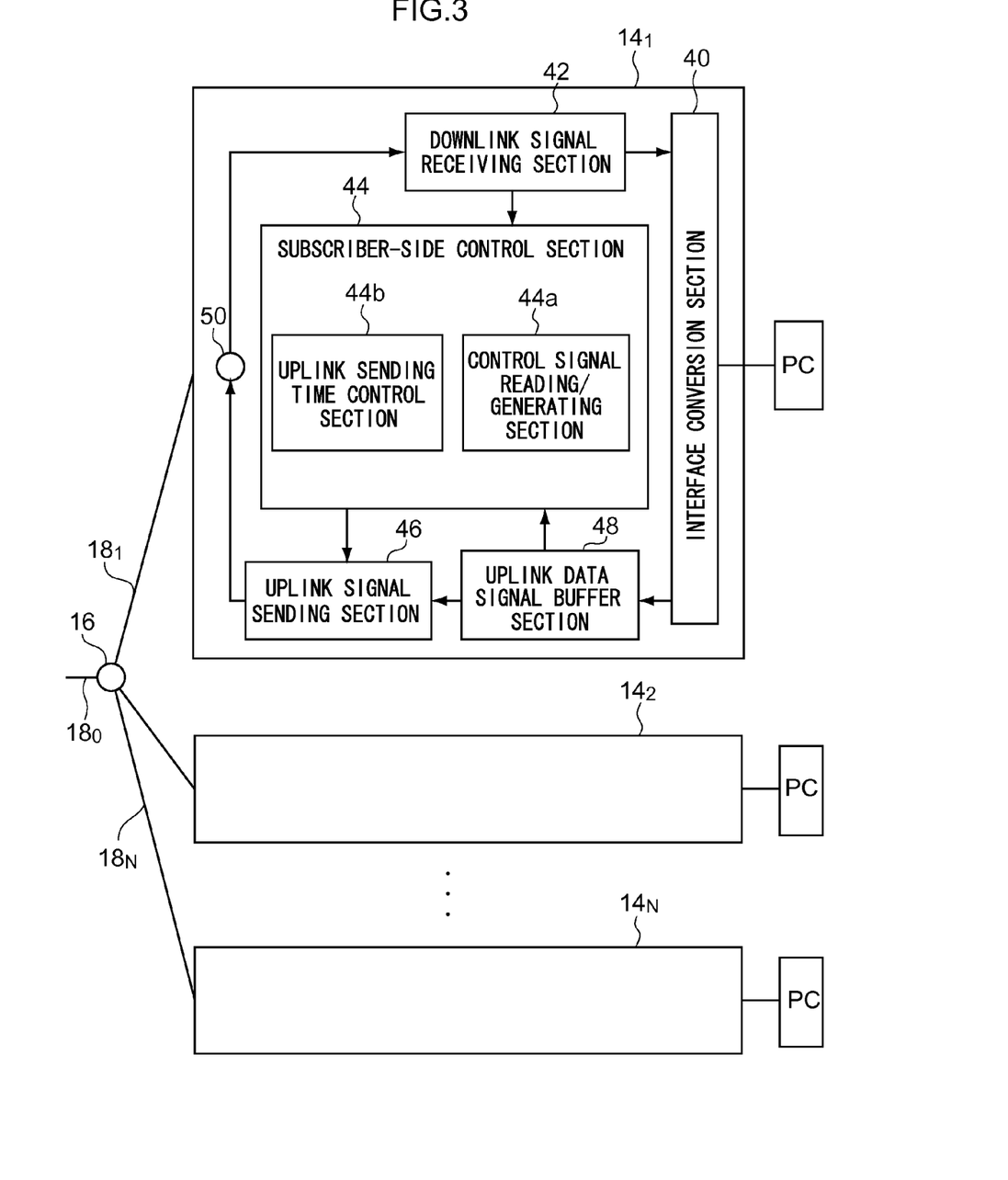
FIG. 3 is a block diagram showing hardware and functional configuration of an ONU.

A configuration of each of the ONUs $14_1$ to $14_N$ will be described by referring to FIG. 3. FIG. 3 is a block diagram showing hardware and functional configuration of the ONU $14_1$. Since the ONU $14_1$ may have a conventional configuration, the illustration and descriptions are partially omitted. Moreover, since the OUNs $14_1$ to $14_N$ have the same configuration, the configuration of the ONU $14_1$ will be described as their representative.

The ONU $14_1$ includes an interface conversion section 40, a downlink signal receiving section 42, a subscriber-side control section 44, an uplink signal sending section 46, an uplink data signal buffer section 48, and an optical multiplexer/de-multiplexer 50.

The ONU $14_1$ may be made of a semiconductor chip on which the interface conversion section 40, the downlink signal receiving section 42, the subscriber-side control section 44, the uplink signal sending section 46, the uplink data signal buffer section 48, and the optical multiplexer/de-multiplexer 50 are formed.

The interface conversion section 40 performs communication protocol process with the user device PC. More particularly, the interface conversion section 40 outputs the uplink data signals from the user device PC to the uplink data signal buffer section 48. Moreover, the interface conversion section 40 is inputted with the downlink data signals from the downlink signal receiving section 42, and the interface conversion section 40 outputs the downlink data signals to the user device PC.

To the uplink data signal buffer section 48 is inputted with the uplink data signals to be sent at the next uplink communication from the interface conversion section 40, and the uplink data signals are temporarily stored.

The uplink signal sending section 46 time-multiplexes the uplink data signals read from the uplink data signal buffer section 48, and the uplink control signals sent from the subscriber-side control section 44 to generate the uplink electric signals. Furthermore, the uplink signal sending section 46 performs electrical-optical conversion to the uplink electric signals, to generate the uplink optical signals, and sends to the OLT 12 through the optical multiplexer/de-multiplexer 50.

The downlink signal receiving section 42 performs optical-electrical conversion to the downlink optical signals inputted from the OLT 12, to obtain the downlink electric signals. The downlink electric signals are split into the downlink control signals and the downlink data signals, to output the downlink control signals to the subscriber-side control section 44 and output the downlink data signals to the interface conversion section 40.

Since the optical multiplexer/de-multiplexer 50 has a similar configuration to that of the above-described optical multiplexer/de-multiplexer 24 of the OLT 12, description thereof is omitted.

The subscriber-side control section 44 is configured as a computer system, in terms of hardware, including a CPU, a ROM, a RAM, a hard disk device and the like (not shown).

Here, the CPU executes a program stored in a storage section (not shown) to implement a control signal reading/generating section 44a and an uplink sending time control section 44b as functional sections.

The CPU acquires information relating to the operation of the ONU $14_1$ from the interface conversion section 40, the downlink signal receiving section 42, the optical multiplexer/de-multiplexer 50, the uplink signal sending section 46, the uplink data signal buffer section 48, and the subscriber-side control section 44, and controls these sections to operate the ONU $14_1$.

The control signal reading/generating section 44a receives the downlink control signals from the downlink signal receiving section 42, reads the bandwidth allocated to the ONU $14_1$, which is described in the downlink control signals, to output to the uplink sending time control section 44b. Furthermore, the control signal reading/generating section 44a reads the requested bandwidth of the ONU $14_1$ from the uplink sending time control section 44b and generates the uplink control signals to output to the uplink signal sending section 46.

The uplink sending time control section 44b reads the bandwidth allocated to the ONU $14_1$, which bandwidth is inputted from the control signal reading/generating section 44a, to control the uplink signal sending section 46 to perform the communication with the read bandwidth. Moreover, the uplink sending time control section 44b monitors an amount of the uplink data temporarily stored in the uplink data signal buffer section 48, and decides the requested bandwidth of the ONU $14_1$, based on the amount of the uplink data to output to the control signal reading/generating section 44a.

(Dynamic Communication Bandwidth Allocation Method)

Figure 4:
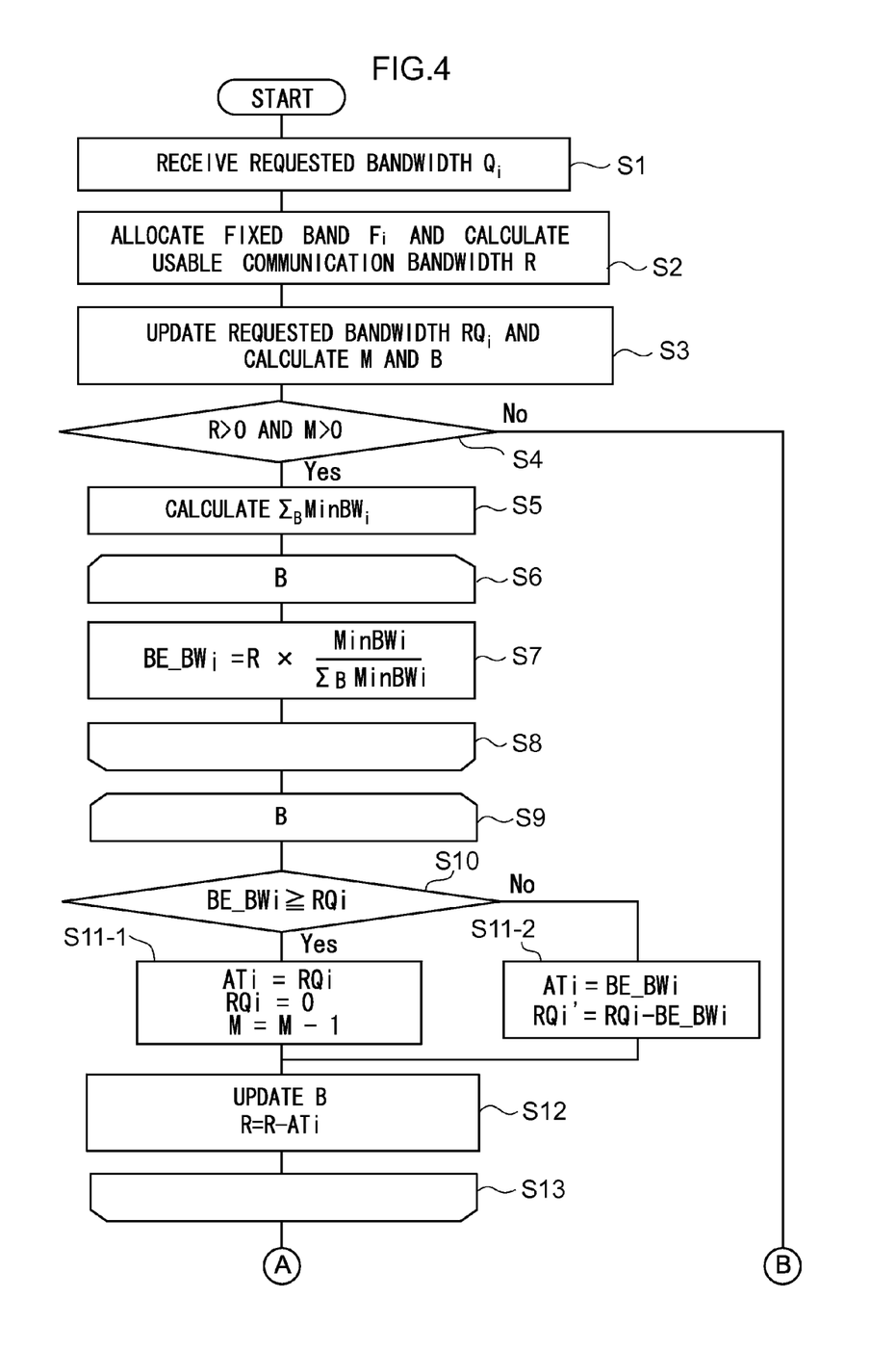
FIG. 4 is a flowchart showing a flow of process of a dynamic communication bandwidth allocation method of the exemplary embodiment of the present invention.
Figure 5:
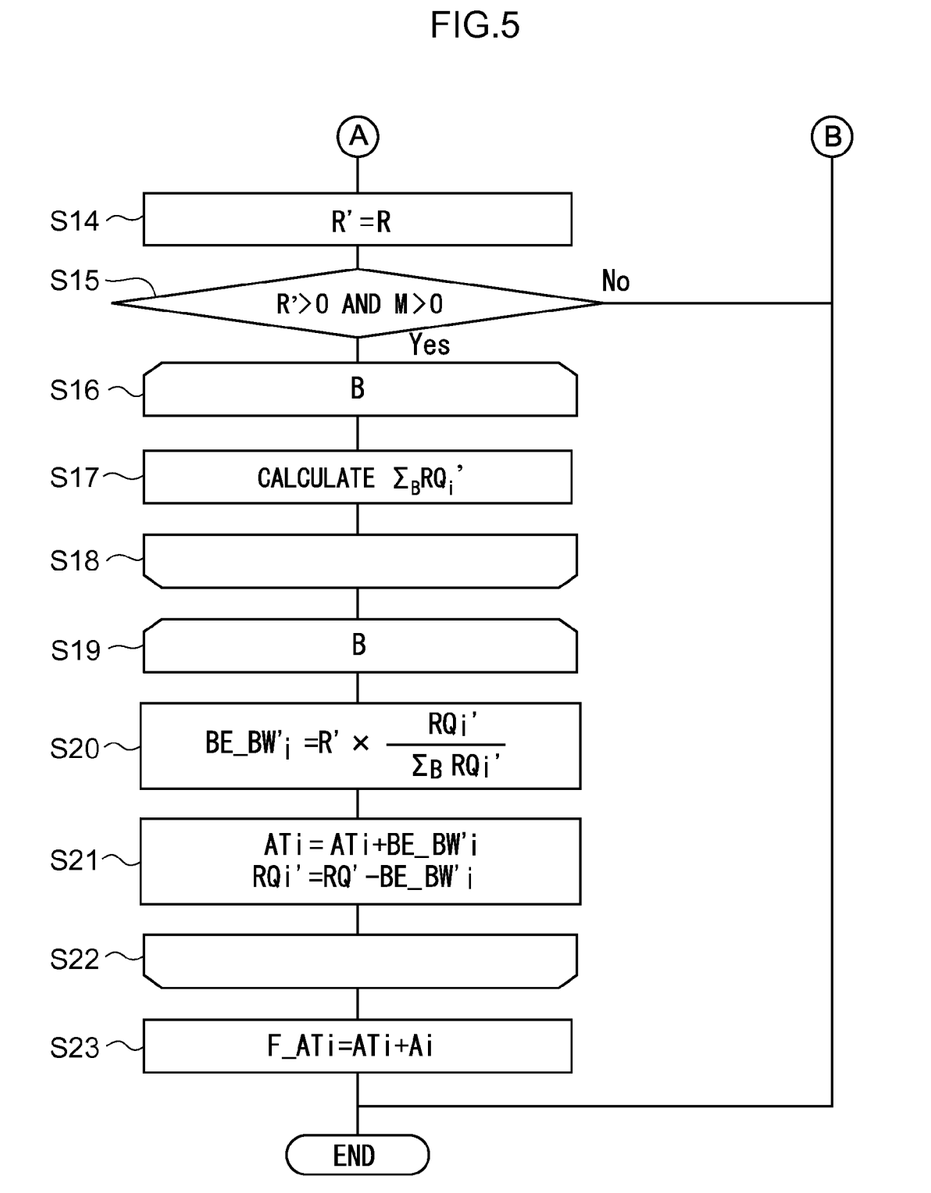
FIG. 5 is a flowchart showing the flow of the process of the dynamic communication bandwidth allocation method of the exemplary embodiment of the present invention.

The dynamic communication bandwidth allocation method of the communication band by the OLT 12 will be described by referring to FIG. 4 and FIG. 5. FIG. 4 and FIG. 5 are flowcharts showing process of the dynamic communication bandwidth allocation method of the present exemplary embodiment.

Here, an overall communication bandwidth of the uplink communication performed by the ONUs $14_1$ to $14_N$ with the OLT 12 is denoted as U.

The dynamic communication bandwidth allocation method of the present exemplary embodiment has a first process (step S1), a preliminary process (steps S2 and S3), a second process (steps S4 to S15), and a third process (steps S16 to S22).

In the first process, the OLT 12 receives, from the ONU $14_i$, a requested bandwidth $Q_i$, which is a bandwidth in which the ONU $14_i$ requires for the communication. Here, "i" is an integer of 1 to N, indicating a unique number allocated to each of the ONUs $14_1$ to $14_N$.

In the preliminary process, a fixed band $F_i$ predetermined for each of the ONUs $14_i$ is allocated, and a sum $\Sigma F_i$ of the fixed bands $F_i$ is calculated. Then, a value obtained by subtracting the sum $\Sigma F_i$ of the fixed bands from the overall usable communication bandwidth U is determined as a usable communication bandwidth R. Further, the fixed band $F_i$ is subtracted from the requested bandwidth $Q_i$ for each of the ONUs $14_i$ to update the requested bandwidth to $RQ_i$.

In the second process, in accordance with the ratio of the SLA parameter predetermined for each of the ONUs $14_i$, the usable communication bandwidth R is calculated as a first allocation bandwidth $BE\_BW_i$ for each of the ONUs $14_i$, and the first allocation bandwidth $BE\_BW_i$ and the requested bandwidth $RQ_i$ is compared. If the first allocation bandwidth $BE\_BW_i$ is more than the requested bandwidth $RQ_i$, the requested bandwidth $RQ_i$ is allocated to the ONU $14_i$, while if the first allocation bandwidth $BE\_BW_i$ is less than the requested bandwidth $RQ_i$, the first allocation bandwidth $BE\_BW_i$ is allocated to the ONU $14_i$.

In the third process, an updated usable communication bandwidth R', which is updated by subtracting a sum of the bandwidths allocated in the second process from the usable communication bandwidth R, is obtained. Then, an updated requested bandwidth $RQ_i'$, is updated by subtracting the bandwidth allocated in the second process from the requested bandwidth $RQ_i$, is obtained. Then, the updated usable communication bandwidth R' is allocated to each of the ONUs $14_i$ as a second allocation bandwidth $BE\_BW_i'$ in accordance with a ratio of the updated requested bandwidth $RQ_i'$.

Following the first process, the second process may be performed without performing the preliminary process.

(First Process)

In step S1, the uplink signal receiving section 26 of the OLT 12 receives, from the uplink signal sending section 46 of the ONU $14_i$, the uplink optical signals including the requested bandwidth $Q_i$, which is the communication bandwidth that the ONU requires.

Then, the uplink signal receiving section 26 of the OLT 12 performs the optical-electrical conversion to convert the uplink optical signals to the uplink electric signals. Next, the uplink signal receiving section 26 splits the uplink electric signals into the uplink control signals and the uplink data signals. The uplink control signals including the requested bandwidth $Q_i$ is sent to the station-side control section 28. Then, the control signal reading/generating section 28a of the station-side control section 28 reads the requested bandwidth $Q_i$ from the uplink control signals to store the same in the storage section 28c.

(Preliminary Process)

In the preliminary process, the fixed band $F_i$ predetermined for each of the ONUs $14_i$ is allocated. Then, the sum $\Sigma F_i$ of the fixed bands $F_i$ is calculated, and the usable communication bandwidth R is obtained form the value obtained by subtracting the sum $\Sigma F_i$ of the fixed bands from the usable overall communication bandwidth U. Then, the requested bandwidth $Q_i$ is updated to $RQ_i$, by subtracting the fixed band $F_i$ from the requested bandwidth $Q_i$.

When the preliminary process is not performed, the requested bandwidth $Q_i$ is used as $RQ_i$. Moreover, the overall communication bandwidth U is used as the usable communication bandwidth R.

More particularly, in step S2, with the reception of the requested bandwidths $Q_i$ from all the ONUs $14_1$ to $14_N$ by the OLT 12 as a key, the preliminary calculation section 28b3 reads the fixed band $F_i$ predetermined for each of the ONUs $14_i$ from the storage section 28c. The fixed band $F_i$ is stored in a task variable for fixed bandwidth allocation $A_i$. Namely, process of $A_i=F_i$ is performed to allocate the fixed band $F_i$ for each of the ONUs. Note that the task variable for fixed bandwidth allocation $A_i$ is stored in the storage section 28c.

Furthermore, the preliminary calculation section 28b3 calculates the sum $\Sigma F_i$ of the fixed bands $F_i$. A sign "$\Sigma$" means that $F_i$ is summed with respect to all "i". Then, the preliminary calculation section 28b3 calculates the usable communication bandwidth R by subtracting $\Sigma F_i$ from the overall communication bandwidth U. Namely, the calculation of $R=U-\Sigma F_i$ is performed.

Accordingly, the usable communication bandwidth R excluding the sum $\Sigma F_i$ of the fixed bands $F_i$ from the overall communication bandwidth U is obtained. The usable communication bandwidth R is then stored in the storage section 28c.

Then, in step S3, the preliminary calculation section 28b3 subtracts the fixed bandwidth $F_i$ from the requested bandwidth $Q_i$ to update the requested bandwidth to $RQ_i$. Namely, $Q_i$ is read from the storage section 28c to perform calculation of $RQ_i=Q_i-F_i$ with respect to all "i".

Further, a number of the ONUs $14_1$ to $14_N$ that satisfies $RQ_i>0$, namely, the requested bandwidth $Q_i>$the fixed bandwidth $F_i$, is denoted as M.

Furthermore, the number i of the ONU $14_i$ that satisfies $RQ_i>0$, namely, the requested bandwidth $Q_i>$the fixed bandwidth $F_i$, is stored in a task variable B.

The variables M and B are stored in the storage section 28c.

For example, if the eight ONUs are contained in the OLT 12, and if the ONUs that satisfy $RQ_i>0$ are the ONU $14_1$, the ONU $14_4$, and the ONU $14_6$, then M=3 and B={1, 4, 6}.

(Second Process)

In the second process, in accordance with a ratio of the SLA parameter predetermined for each of the ONUs $14_i$ to a sum thereof: $MinBW_i/\Sigma_B MinBW_i$, the usable communication bandwidth R is calculated as the first allocation bandwidth $BE\_BW_i$ for each of the ONUs $14_i$. The first allocation bandwidth $BE\_BW_i$ and the requested bandwidth $RQ_i$ are compared, and if the first allocation bandwidth $BE\_BW_i$ is more than the requested bandwidth $RQ_i$, the requested bandwidth $RQ_i$ is allocated to the ONU $14_i$, and if the first allocation bandwidth $BE\_BW_i$ is less than the requested bandwidth $RQ_i$, the first allocation bandwidth $BE\_BW_i$ is allocated to the ONU $14_i$.

More particularly, first, in step S4, the first calculation section 28b1 performs condition determination. The condition determination relates to whether R>0 and M>0 is established. If "R>0" is established, the usable communication bandwidth R to be allocated to the ONU is left. If "M>0" is established, the ONU whose requested bandwidth $RQ_i$ is not satisfied exists.

As a result of the determination in step S4, if a negative determination is made, the process ends. In contrast, if an affirmative determination is made, the process proceeds to step S5.

In step S5, the first calculation section 28b1 reads, from the storage section 28c, the SLA parameter predetermined for each of the ONUs $14_i$ in accordance with the contract with the user. In this exemplary embodiment, the SLA parameter is preferably, for example, a minimum guaranteed band $MinBW_i$ predetermined for each of the ONUs $14_i$. Here, the ONU whose minimum guaranteed band $MinBW_i$ is read satisfies $RQ_i>0$. Namely, only for the ONU whose value is stored in the task variable B, the minimum guaranteed band $MinBW_i$ is read.

Then, the first calculation section 28b1 reads the task variable B from the storage section 28c, and for the ONUs whose number i is stored in the task variable B, a sum of the minimum guaranteed bands $MinBW_i$ is calculated. Namely, as described above, in a case of B={1, 4, 6}, calculation of $MinBW_1+MinBW_4+MinBW_6$ is performed. Hereinafter, with respect to an arbitrary variable Di, which is distinguished by the subscript i, a sum of the numbers i stored in the task variable B may be expressed as $\Sigma_B D_i$. Namely, in this step, $\Sigma_B MinBW_i$ is determined. The determined $\Sigma_B MinBW_i$ is then stored in the storage section 28c.

In steps S6 to S8, the first calculation section 28b1 calculates the first allocation bandwidth $BE\_BW_i$ in order to allocate the usable communication bandwidth R to each of the ONUs $14_i$ in accordance with the ratio of the minimum guaranteed band $MinBW_i$.

More particularly, in step S7, the first calculation section 28b1 reads $\Sigma_B MinBW_i$ from the storage section 28c to calculate $BE\_BW_i = R \times MinBW_i / \Sigma_B MinBW_i$. This allows the usable communication bandwidth R to be distributed as the first allocation bandwidths $BE\_BW_i$ in accordance with the ratio of the minimum guaranteed band $MinBW_i$. The determined first allocation bandwidth $BE\_BW_i$ is then stored in the storage section 28c.

The process in steps S6 to S8 is a loop processing using the task variable B as a repetitive variable. Namely, in a case of B={1, 4, 6} as described above, the loop process is performed to the ONU $14_1$, the ONU $14_4$, and the ONU $14_6$. Thus, in steps S6 to S8, the first allocation bandwidths $BE\_BW_1$, $BE\_BW_4$ and $BE\_BW_6$ are calculated.

In steps S9 to S14, the first calculation section 28b1 performs the allocation of the first allocation bandwidth $BE\_BW_i$ determined in steps S6 to S8.

The process in steps S9 to S14 is also a loop processing using the task variable B used as a repetitive variable. Namely, the processes in steps S9 to S14 is performed for the ONU whose requested bandwidth $Q_i$ is larger than the fixed band $F_i$, and the communication band thereof is deficient. As described above, in a case of B={1, 4, 6}, the loop processing is performed for the ONU $14_1$, the ONU $14_4$ and the ONU $14_6$.

In step S10, the first calculation section 28b1 compares the magnitudes of the first allocation bandwidth $BE\_BW_i$ and the requested bandwidth $RQ_i$ read from the storage section 28c. If $BE\_BW_i \geq RQ_i$ is established, the process proceeds to step S11-1. In contrast, if $BE\_BW_i \geq RQ_i$ is not established, namely, if $BE\_BW_i<RQ_i$, the process proceeds to step S11-2.

The process in step S11-1 is performed, if $BE\_BW_i \geq RQ_i$, namely, if the first allocation bandwidth $BE\_BW_i$ to be allocated to the ONU $14_i$ is more than the requested bandwidth $RQ_i$, which is a bandwidth that the ONU $14_i$ requires. In this case, the first calculation section 28b1 allocates a band satisfying the requested bandwidth $RQ_i$ to the ONU $14_i$. Namely, the first calculation section 28b1 inputs $RQ_i$ to $AT_i$ to allocate the band to the ONU $14_i$. Here, $AT_i$ denotes a task variable for allocation. Furthermore, since the band satisfying the requested bandwidth $RQ_i$ is allocated to the ONU $14_i$, the first calculation section 28b1 updates the $RQ_i$ to 0. Furthermore, the first calculation section 28b1 reduces the number of ONUs, whose requested bandwidth $RQ_i$ is not satisfied, by one.

In step S7, in accordance with the ratio of the minimum guaranteed band predetermined, the first allocation bandwidth $BE\_BW_i$ is determined. If $BE\_BW_i$ is more than the bandwidth that the ONU $14_i$ requires (the requested bandwidth $RQ_i$), then, in step S11-1, an excess of the communication band of $(BE\_BW_i - RQ_i)$ occurs.

The process in step S11-2 is performed if $BE\_BW_i < RQ_i$, namely, if the first allocation bandwidth $BE\_BW_i$ to be allocated to the ONU $14_i$ is less than the requested bandwidth $RQ_i$, which is the bandwidth that the ONU $14_i$ requires. Thus, in this case, the first calculation section 28b1 allocates the first allocation bandwidth $BE\_BW_i$ to the ONU $14_i$. Namely, the first calculation section 28b1 inputs $BE\_BW_i$ to the task variable for allocation $AT_i$.

Furthermore, the first calculation section 28b1 determines the updated requested bandwidth $RQ_i'$, which has been updated by subtracting the bandwidth $BE\_BW_i$ allocated in the second process from the requested bandwidth $RQ_i$. Namely, the first calculation section 28b1 performs calculation of $RQ_i' = RQ_i - BE\_BW_i$.

In step S12, the first calculation section 28b1 performs various types of update process.

First, the task variable B is updated. Specifically, the number i of the ONU to which the band satisfying the requested bandwidth $RQ_i$ is allocated in step S11-1 is deleted from the task variable B. For example, if the requested bandwidth $RQ_1$ of the $ONU_1$ is satisfied under B={1, 4, 6}, the updated B becomes {4, 6}.

Furthermore, since the allocation process of $AT_i = RQ_i$ in step S11-1, and of $AT_i = BE\_BW_i$ in step S11-2 reduces the usable communication bandwidth R, the usable communication bandwidth R is updated. Namely, process of $R = R - AT_i$ is performed to sequentially subtract the bandwidths $AT_i$ allocated in the second process from the usable communication bandwidth R.

In step S14, the first calculation section 28b1 determines the updated usable communication bandwidth R'. Namely, when step S12 which is process under loop with respect to the task variable B, is ended, the sum of the bandwidths allocated in this process (the second process) is subtracted from the usable communication bandwidth R. Thus, the process of R'=R is performed to obtain the updated usable communication bandwidth R', which is updated by subtracting the sum of the bandwidths allocated in this process (the second process) from the usable communication bandwidth R.

In step S15, the first calculation section 28b1 performs the condition determination. This condition determination relates to whether R>0 and M>0 is established.

In step S15, if negative determination is made, then the process ends. In contrast, if affirmative determination is made, then the process proceeds to step S16.

(Third Process)

In the third process, the updated usable communication bandwidth R', which is updated by subtracting the sum of the bandwidths allocated in the second process from the usable communication bandwidth R, is allocated to each of the ONUs $14_i$ as the second allocation bandwidth $BE\_BW'_i$ in accordance with the ratio of the updated requested bandwidth $RQ_i'$, which is updated by subtracting the bandwidth $BE\_BW_i$ allocated in the second process from the requested bandwidth $RQ_i$, to the requested bandwidths of all the optical network sections ($RQ_i'/\Sigma_B RQ_i'$).

More particularly, first, in steps S16 to S18, the second calculation section 28b2 performs the sum processing of the updated requested bandwidths $RQ_i'$. The processing in steps S16 to S18 is also the loop processing using the task variable B used as a repetitive variable. In steps S16 to S18, $\Sigma_B RQ_i'$, which is the sum of the updated requested bandwidths $RQ_i'$, is determined.

In steps S19 to S22, the second calculation section 28b2 performs the second bandwidth allocation to the ONUs $14_1$ to $14_N$. The process in steps S19 to S22 is the loop processing using the task variable B used as a repetitive variable.

First, in step S20, in accordance with the ratio of the updated requested bandwidth $RQ_i'$ to the overall updated requested bandwidth: $\Sigma_B RQ_i'$ ($RQ_i'/\Sigma_B RQ_i'$), the second allocation bandwidth $BE\_BW'_i$ is calculated.

More particularly, in step S20, the second calculation section 28b2 performs calculation of $BE\_BW'_i = R' \times RQ_i'/\Sigma_B RQ_i'$. This allows the updated usable communication bandwidth R' to be distributed as the second allocation bandwidth $BE\_BW'_i$ in accordance with the ratio of the updated requested bandwidth $RQ_i'$ to the overall updated requested bandwidth: $\Sigma_B RQ_i'$ ($RQ_i'/\Sigma_B RQ_i'$).

Then, in step S21, the second calculation section 28b2 allocates the second allocation bandwidth $BE\_BW'_i$ to the ONU $14_1$. Namely, the second calculation section 28b2 performs allocation of band to the ONU $14_i$ by using a result of the calculation of $AT_i + BE\_BW'_i$ as the new task variable for allocation $AT_i$. Furthermore, the process uses a result of the calculation of $RQ_i' - BE\_BW'_i$ as the new requested bandwidth $RQ_i'$.

In the third process, the updated usable communication bandwidth R' is distributed to the ONU $14_i$ in accordance with the ratio of the updated requested bandwidth $RQ_i$, which is the bandwidth that the ONU $14_i$ requires ($RQ_i'/\Sigma_B RQ_i'$). Accordingly, the updated usable communication bandwidth R' can be distributed to each of the ONUs $14_i$ without deficiency and excess.

Then, final process in step S23 is performed. In step S23, the second calculation section 28b2 obtains a final allocation bandwidth $F\_AT_i$ from the communication band $AT_i$ allocated in the steps until S22 and the task variable for fixed bandwidth allocation $A_i$. Namely, calculation of $F\_AT_i = AT_i + A_i$ is performed. The control signals reading/generating section 28a reads the final allocation bandwidth $F\_AT_i$ to generate the downlink control signals. The downlink control signals is time-multiplexed with the downlink data signals in the downlink signal sending section 22 to be sent to the ONUs $14_1$ to $14_N$.

The ONU $14_i$ receives the downlink signals, extracts the downlink control signals from the downlink signals in the downlink signal receiving section 42 to output to the control signal reading/generating section 44a. The control signal reading/generating section 44a reads the final allocation bandwidth $F\_AT_i$ from the downlink control signals to output to the uplink sending time control section 44b. The uplink sending time control section 44b having the final allocation bandwidth $F\_AT_i$ inputted, and performs the uplink communication based on the read final allocation bandwidth $F\_AT_i$.

According to the dynamic communication bandwidth allocation method of the present exemplary embodiment, in the first calculation in the second process, the allocation of the communication band is performed in accordance with the ratio of the SLA parameter, and in the second calculation in the third process, the excess band occurred by the first calculation is allocated in accordance with the ratio of the updated requested band $RQ_i'$. As a result, in the present exemplary embodiment, the number of repetitions of calculation of the bandwidth allocation may be reduced to two, which may shorten the calculation time of the bandwidth allocation and may reflect the service level ratios among the users on the bandwidth allocation.

While in the present exemplary embodiment, the minimum guaranteed band $MinBW_i$ is employed as the SLA parameter, the SLA parameter is not limited to the minimum guaranteed band $MinBW_i$, and for example, a maximum allocation band or other parameters relating to the communication speed may be employed.

(Dynamic Communication Bandwidth Allocation Program)

Figure 6:
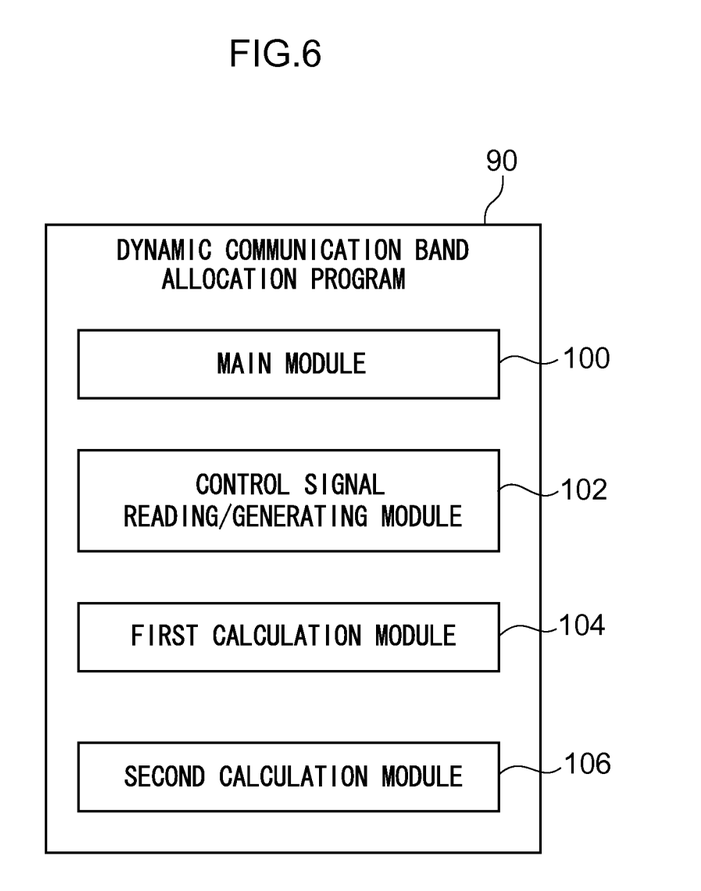
FIG. 6 is a diagram showing configuration of a module of a dynamic communication bandwidth allocation program.

A program for causing a computer to execute the above-described dynamic communication bandwidth allocation method will be described by referring to FIG. 6. FIG. 6 is a diagram showing a module configuration of the dynamic communication bandwidth allocation program.

A dynamic communication bandwidth allocation program 90 includes a main module 100 controlling the overall processing, a control signal reading/generating module 102, a first calculation module 104, and a second calculation module 106. Here, the control signal reading/generating module 102, the first calculation module 104 and the second calculation module 106 cause the computer to perform similar functions to the above-described functions that the control signal reading/generating section 28a, the first calculation section 28b1 and the second calculation section 28b2, respectively.

The dynamic communication bandwidth allocation program 90 is provided, for example, by a storage medium such as a CD-ROM, a DVD and a ROM or a semiconductor memory. Moreover, the dynamic communication bandwidth allocation program 90 may be provided through a network as a computer data signals superimposed on a carrier wave.

Simulation has been performed to confirm an effect of the present invention. In this simulation, a GE-PON system in which eight ONUs 1 to 8 are contained in one OLT is assumed. In this GE-PON system, the overall communication bandwidth at the time of uplink communication is 500 Mbps, and this overall communication bandwidth is distributed to the eight ONUs.

As shown in Table 1, as the SLA parameter of the respective ONUs, the minimum guaranteed band MinBW at the time of uplink communication is employed. Moreover, a minimum value and a maximum value are set for the requested bandwidth, which is the bandwidth that each of the ONUs requests to the OLT, and the requested bandwidth in the simulation takes a random number value between this minimum value and the maximum value.

Particularly for the ONUs 7 and 8, the maximum value of the requested bandwidth is set to be fixed at 1 Mbps, and at the time of first bandwidth allocation calculation, a remainder band is set to be occurred.

TABLE 1

|  |  | ONU1 | ONU2 | ONU3 | ONU4 | ONU5 | ONU6 | ONU7 | ONU8 |
|---|---|---|---|---|---|---|---|---|---|
| MinBW(Mbps) |  | 1 | 1 | 1 | 10 | 10 | 10 | 100 | 100 |
| Requested bandwidth (Mbps) | Minimum value | 1 | 1 | 1 | 1 | 1 | 1 | 1 | 1 |
|  | Maximum value | 200 | 200 | 200 | 50 | 50 | 50 | 1 | 1 |

In the simulation, the bandwidth allocation to the ONUs 1 to 8 is performed by the following three types of calculation methods: (I) Dynamic communication bandwidth allocation method of the present exemplary embodiment (the present exemplary embodiment); (II) Method in Patent Literature 1, in which the number of times of the repeated allocation calculation of the excess band is limited to two (a comparative example); and (III) Method described in JP-A No. 2007-129429, in which the repeated allocation calculation is performed until the excess band is eliminated (a conventional example). Note that, in (II) the calculation method of the comparative example, the excess band that is not allocated in the calculation twice is discarded without being allocated.

Figure 7:
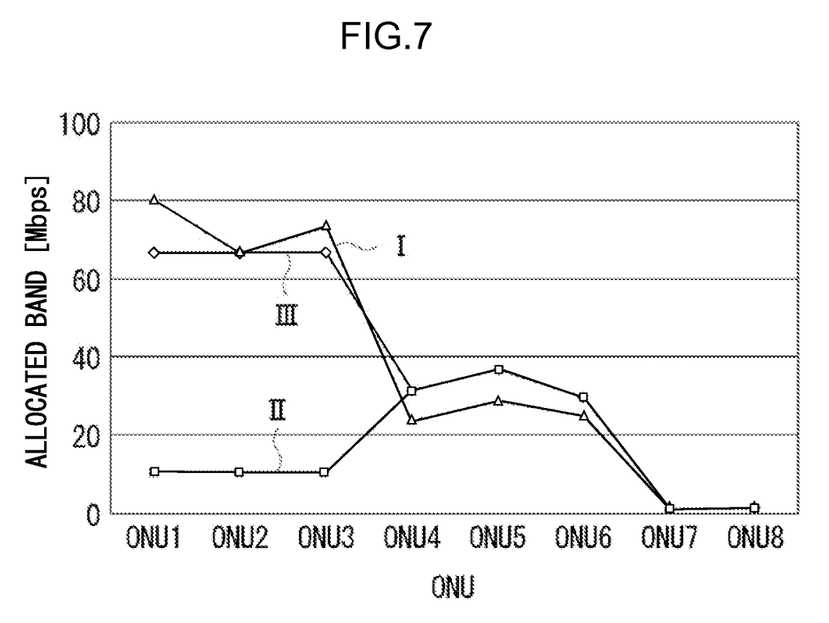
FIG. 7 is a diagram showing the simulation results.

Simulation results are shown in FIG. 7. A vertical axis in the figure indicates the allocated bandwidth (Mbps), and a horizontal axis indicates the numbers of ONUs 1 to 8. In FIG. 7, three curves I to III corresponding to the above-described calculation methods are shown.

Referring to FIG. 7, the curve I of the exemplary embodiment exhibits favorite matching to the curve III showing the conventional example in which the repeated calculation is performed unlimitedly until the excess band is eliminated. In contrast, the curve II showing the comparative example in which the number of times of the repeated calculation of the excess band is limited to two largely differs from the curve III showing the related-art example, in the ONUs 1 to 3. This is affected by the discard of the excess band in the curve II.

From FIG. 7, when band usage ratios each indicating a ratio of the bandwidth used for the allocation to the overall communication bandwidth (500 Mbps) is determined, the present exemplary embodiment (the curve I) and the conventional example (the curve III) exhibit 100%, while the comparative example (the curve II) exhibits about 45%.

Since in the calculation of the bandwidth allocation, the same calculation content is executed between the first time, and the second time and later, time required for the calculation is linear proportional to the number of times of calculation. A maximum number of times of the bandwidth allocation calculation in the conventional example is the same as a number N of the connected ONUs if the requested band of the one ONU is satisfied in one bandwidth allocation. On the other hand, the number of times of calculation in the example is two at a maximum. Therefore, as compared with the present exemplary embodiment and the conventional example in the maximum number of times of calculation, the present exemplary embodiment may shorten calculation time to 2/N of that in the conventional example.

In this manner, the dynamic communication bandwidth allocation method of the present exemplary embodiment (the curve I) may reflect the ratio of the SLA parameter on the bandwidth allocation while shortening the calculation time as compared with that in the conventional example (the curve III).

What is claimed is:

1. A dynamic communication bandwidth allocation method for allocating a communication band to each of a plurality of subscriber-side terminal devices in a PON system that connects, via an optical coupler, the plurality of subscriber-side terminal devices and an station-side terminal device to perform communication, the method, in the station-side terminal device, comprising:
   receiving, by the station-side terminal device, a requested bandwidth, which is a bandwidth that the relevant subscriber-side terminal device requires for the communication, from each of the subscriber-side terminal devices;
   calculating, by the station-side terminal device, a usable communication bandwidth as a first allocation bandwidth for each of the subscriber-side terminal devices based on a ratio of a service level parameter predetermined for each of the subscriber-side terminal devices, comparing the first allocation bandwidth and the requested bandwidth, and allocating the requested bandwidth to the subscriber-side terminal device if the first allocation bandwidth is more than the requested bandwidth, and allocating the first allocation bandwidth to the subscriber-side terminal device if the first allocation bandwidth is less than the requested bandwidth; and
   obtaining, by the station-side terminal device, an updated usable communication bandwidth updated by subtracting a sum of the allocated bandwidths from the usable communication bandwidth, and obtaining an updated requested bandwidth updated by subtracting the allocated bandwidth from the requested bandwidth, and allocating the updated usable communication bandwidth to each of the subscriber-side terminal devices as a second allocation bandwidth based on a ratio of the updated requested bandwidth.

2. The dynamic communication bandwidth allocation method according to claim 1, after receiving the requested bandwidth, further comprising:
   allocating, by the station-side terminal device, a fixed band predetermined for each of the subscriber-side terminal devices, calculating a sum of the fixed bands, using a value obtained by subtracting the sum of the fixed bands from the usable overall communication bandwidth as the usable communication bandwidth; and updating the requested bandwidth by subtracting, for each of the subscriber-side terminal devices, the fixed band from the requested bandwidth.

3. The dynamic communication bandwidth allocation method according to claim 1,
   wherein allocating the updated usable communication bandwidth to each of the subscriber-side terminal devices as the second allocation bandwidth comprises:
   comparing the second allocation bandwidth and the updated requested bandwidth;
   allocating the updated requested bandwidth to the subscriber-side terminal device, if the second allocation bandwidth is more than the updated requested bandwidth; and allocating the second allocation bandwidth to the subscriber-side terminal device, if the second allocation bandwidth is less than the updated requested bandwidth.

4. The dynamic communication bandwidth allocation method according to claim 1, wherein the service level parameter is a minimum guaranteed band or a maximum allocation band.

5. A non-transitory computer-readable medium storing a dynamic communication bandwidth allocation program for allocating a communication band to each of a plurality of subscriber-side terminal devices in a PON system that connects, via an optical coupler, the plurality of subscriber-side terminal devices and a station-side terminal device to perform communication, the dynamic communication bandwidth allocation program causing the station-side terminal device to function as:
 a control signal reading/generating section that receives a requested bandwidth, which is a bandwidth that the relevant subscriber-side terminal device requires for the communication, from each of the subscriber-side terminal devices;
 a first calculation section that, calculates a usable communication bandwidth as a first allocation bandwidth for each of the subscriber-side terminal devices based on a ratio of a service level parameter predetermined for each of the subscriber-side terminal devices, compares the first allocation bandwidth and the requested bandwidth, and allocates the requested bandwidth to the subscriber-side terminal device if the first allocation bandwidth is more than the requested bandwidth, and allocates the first allocation bandwidth to the subscriber-side terminal device if the first allocation bandwidth is less than the requested bandwidth; and
 a second calculation section that obtains an updated usable communication bandwidth updated by subtracting a sum of the allocated bandwidths from the usable communication bandwidth, obtains an updated requested bandwidth updated by subtracting the allocated bandwidth from the requested bandwidth, and allocates the updated usable communication bandwidth to each of the subscriber-side terminal devices as a second allocation bandwidth based on a ratio of the updated requested bandwidth.

6. The computer-readable medium according to claim 5, wherein the dynamic communication bandwidth allocation program additionally causes the station-side terminal device to function as:
 a preliminary calculation section that allocates a fixed band predetermined for each of the subscriber-side terminal devices, calculates a sum of the fixed bands, uses a value obtained by subtracting the sum of the fixed bands from a usable overall communication bandwidth as the usable communication bandwidth, and updates the requested bandwidth by subtracting, for each of the subscriber-side terminal devices, the fixed band from the requested bandwidth.

7. The non-transitory computer-readable medium according to claim 5, wherein the second calculation section:
 compares the second allocation bandwidth and the updated requested bandwidth,
 allocates the updated requested bandwidth to the subscriber-side terminal device, if the second allocation bandwidth is more than the updated requested bandwidth, and
 allocates the second allocation bandwidth to the subscriber-side terminal device, if the second allocation bandwidth is less than the updated requested bandwidth.

8. The non-transitory computer-readable medium according to claim 5, wherein the service level parameter is a minimum guaranteed band or a maximum allocation band.

9. A PON system that connects, via an optical coupler, a plurality of subscriber-side terminal devices and an station-side terminal device to perform communication, and allocates a communication band to the subscriber-side terminal devices, the station-side terminal device comprising:
 a control signal reading/generating section that receives a requested bandwidth which is a bandwidth that the relevant subscriber-side terminal device requires for the communication, from each of the subscriber-side terminal devices; and
 an uplink band allocating section comprising,
  a first calculation section that calculates a usable communication bandwidth as a first allocation bandwidth for each of the subscriber-side terminal devices based on a ratio of a service level parameter predetermined for each of the subscriber-side terminal devices, compares the first allocation bandwidth and the requested bandwidth, and allocates the requested bandwidth to the subscriber-side terminal device if the first allocation bandwidth is more than the requested bandwidth, and allocates the first allocation bandwidth to the subscriber-side terminal device if the first allocation bandwidth is less than the requested bandwidth, and
  a second calculation section that obtains an updated usable communication bandwidth updated by subtracting a sum of the allocated bandwidths from the usable communication bandwidth, and obtains an updated requested bandwidth updated by subtracting the allocated bandwidth from the requested bandwidth to allocate the updated usable communication bandwidth to each of the subscriber-side terminal devices as a second allocation bandwidth based on a ratio of the updated requested bandwidth.

10. The PON system according to claim 9, wherein the station-side terminal device comprises a preliminary calculation section that allocates a fixed band predetermined for each of the subscriber-side terminal devices, calculates a sum of the fixed bands, uses a value obtained by subtracting the sum of the fixed bands from the usable overall communication bandwidth, as the usable communication bandwidth, and updates the requested bandwidth by subtracting, for each of the subscriber-side terminal devices, the fixed band from the requested bandwidth.

11. The PON system according to claim 9, wherein the second calculation section,
 compares the second allocation bandwidth and the updated requested bandwidth,
 allocates the updated requested bandwidth to the subscriber-side terminal device, if the second allocation bandwidth is more than the updated requested bandwidth, and
 allocates the second allocation bandwidth to the subscriber-side terminal device, if the second allocation bandwidth is less than the updated requested bandwidth.

12. The PON system according to claim 9, wherein the service level parameter is a minimum guaranteed band or a maximum allocation band.

13. The semiconductor chip according to claim 9, wherein the station-side terminal device comprises a preliminary calculation section that allocates a fixed band predetermined for each of the subscriber-side terminal devices, calculates a sum of the fixed bands, uses a value obtained by subtracting the sum of the fixed bands from the usable overall communication bandwidth as the usable communication bandwidth, and updates the requested bandwidth by subtracting, for each of the subscriber-side terminal devices, the fixed band from the requested bandwidth.

14. The semiconductor chip according to claim 9, wherein the second calculation section:
   compares the second allocation bandwidth and the updated requested bandwidth,
   allocates the updated requested bandwidth to the subscriber-side terminal device, if the second allocation bandwidth is more than the updated requested bandwidth, and
   allocates the second allocation bandwidth to the subscriber-side terminal device, if the second allocation bandwidth is less than the updated requested bandwidth.

15. The semiconductor chip according to claim 9, wherein the service level parameter is a minimum guaranteed band or a maximum allocation band.

16. A semiconductor chip provided in an station-side terminal device that is connected, via an optical coupler, to a plurality of subscriber-side terminal devices, that performs communication with the plurality of subscriber-side terminal devices, and that allocates a communication band to the subscriber-side terminal devices, the semiconductor chip comprising:
   a control signal reading/generating section that receives a requested bandwidth which is a bandwidth that the relevant subscriber-side terminal device requires for the communication, from each of the subscriber-side terminal devices; and
   an uplink band allocating section comprising,
      a first calculation section that calculates a usable communication bandwidth as a first allocation bandwidth for each of the subscriber-side terminal devices based on a ratio of a service level parameter predetermined for each of the subscriber-side terminal devices, compares the first allocation bandwidth and the requested bandwidth, and allocates the requested bandwidth to the subscriber-side terminal device if the first allocation bandwidth is more than the requested bandwidth, and allocates the first allocation bandwidth to the subscriber-side terminal device if the first allocation bandwidth is less than the requested bandwidth, and
      a second calculation section that obtains an updated usable communication bandwidth updated by subtracting a sum of the allocated bandwidths from the usable communication bandwidth, and obtains an updated requested bandwidth updated by subtracting the allocated bandwidth from the requested bandwidth to allocate the updated usable communication bandwidth to each of the subscriber-side terminal devices as a second allocation bandwidth based on a ratio of the updated requested bandwidth.

17. A semiconductor chip provided in a subscriber-side terminal device that is connected to a station-side terminal device via an optical coupler, and that performs communication with the station-side terminal device, the semiconductor chip comprising:
   an uplink signal sending section that generates uplink optical signals by electrical-optical converting uplink electric signals, and send the uplink optical signals to the station-side terminal device;
   a downlink signal receiving section that obtains downlink electric signals by optical-electrical converting downlink optical signals sent from the station-side terminal device;
   a control signal reading/generating section that reads a bandwidth, allocated by the station-side terminal device, included in the downlink electric signals, and sends a requested bandwidth, which is a bandwidth required for the communication, to the station-side terminal device; and
   an uplink sending time control section that controls the uplink signal sending section to perform the communication by using the bandwidth that has been read by the control signal reading/generating section, monitors an uplink data amount to determine the requested bandwidth based on the uplink data amount, and outputs the requested bandwidth to the control signal reading/generating section,
   wherein the bandwidth allocated to the station-side terminal device is calculated based on a ratio of a service level parameter to the subscriber-side terminal devices.

* * * * *

UNITED STATES PATENT AND TRADEMARK OFFICE
CERTIFICATE OF CORRECTION

PATENT NO. : 8,724,991 B2
APPLICATION NO. : 13/398821
DATED : May 13, 2014
INVENTOR(S) : Masahiro Sarashina and Satoshi Furusawa

It is certified that error appears in the above-identified patent and that said Letters Patent is hereby corrected as shown below:

Title Page, Item 73 (Assignee)

Change the Assignees to read as follows:

-- Oki Electric Industry Co., Ltd., Tokyo, Japan
 OF Networks Co., Ltd., Chiba, Japan --

Signed and Sealed this
Thirty-first Day of March, 2015

Michelle K. Lee
*Director of the United States Patent and Trademark Office*